(12) United States Patent
Suzuki

(10) Patent No.: US 8,143,564 B2
(45) Date of Patent: Mar. 27, 2012

(54) PHOTODETECTION CIRCUIT

(75) Inventor: Takashi Suzuki, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 374 days.

(21) Appl. No.: 11/995,267

(22) PCT Filed: Jul. 11, 2006

(86) PCT No.: PCT/JP2006/313760
§ 371 (c)(1),
(2), (4) Date: Jan. 10, 2008

(87) PCT Pub. No.: WO2007/007747
PCT Pub. Date: Jan. 18, 2007

(65) Prior Publication Data
US 2009/0272878 A1    Nov. 5, 2009

(30) Foreign Application Priority Data

Jul. 12, 2005 (JP) .............................. P2005-203520

(51) Int. Cl.
*G01J 1/44* (2006.01)
*H03F 3/08* (2006.01)
*H03F 3/14* (2006.01)
*H01J 43/00* (2006.01)

(52) U.S. Cl. .............. 250/206; 250/214 A; 250/214 LA; 330/307

(58) Field of Classification Search .............. 250/214 R, 250/206, 214 A, 214 LA, 214 SW, 214 LS, 250/208.1, 214.1, 214 C, 214 AG; 348/296, 348/301–311; 327/132, 306, 333, 336, 514, 327/515, 524; 257/57, 59, 72, 291, 292; 330/253, 307, 260
See application file for complete search history.

(56) References Cited

U.S. PATENT DOCUMENTS

| | | | |
|---|---|---|---|
| 4,160,160 A * | 7/1979 | Hasegawa et al. ......... | 250/214 P |
| 4,260,981 A * | 4/1981 | Yamauchi et al. ....... | 340/870.11 |
| 4,693,597 A * | 9/1987 | Shiomi et al. ................ | 356/3.04 |
| 5,625,181 A | 4/1997 | Yasuda et al. | |
| 6,229,398 B1 | 5/2001 | Auric et al. | |
| 6,684,032 B1 * | 1/2004 | Umeda .......................... | 398/202 |

(Continued)

FOREIGN PATENT DOCUMENTS

EP  0 986 170  3/2000

(Continued)

*Primary Examiner* — Georgia Y Epps
*Assistant Examiner* — Don Williams
(74) *Attorney, Agent, or Firm* — Drinker Biddle & Reath LLP

(57) ABSTRACT

This photodetecting circuit 1 is capable of suppressing oscillation of an output, and operates as a zero bias circuit in a case of a small photoelectric current to an extent that a dark current is concerned about, and limits an output current in a case of a large photoelectric current to an extent that troubles are caused in the circuit operation. Because a resistive element TR2 is provided in the photodetecting circuit 1, even when a modulation frequency of light, in other words, a frequency of a photoelectric current I flowing in a photodiode PD is made higher, oscillation can be suppressed. Further, due to the resistive element TR2 being inserted, this functions as a limiter as well, and a bias voltage to be applied to the photodiode PD is made to be a positive bias voltage, which prevents an excess current from being generated to suppress abnormal operations of the circuit.

4 Claims, 4 Drawing Sheets

U.S. PATENT DOCUMENTS 6,841,771 B2 * 1/2005 Shimizu .................... 250/214 A

FOREIGN PATENT DOCUMENTS

| | | |
|---|---|---|
| JP | 62-285537 | 12/1987 |
| JP | 63-81225 | 4/1988 |
| JP | 63-204131 | 8/1988 |
| JP | 2-64422 | 3/1990 |
| JP | 5-22232 | 1/1993 |
| JP | 7-245540 | 9/1995 |
| JP | 2000-68947 | 3/2000 |
| JP | 2000-124748 | 4/2000 |
| JP | 2003-315149 | 11/2003 |

* cited by examiner

PHOTODETECTION CIRCUIT

TECHNICAL FIELD

The present invention relates to a photodetecting circuit.

BACKGROUND ART

In accordance with a photodetecting circuit described in Patent Document 1, there is disclosed that, in a device loading an electric current generated in a photodiode via an integrating circuit, the photodiode is driven to be zero-biased. When the photodiode is driven to be zero-biased, it is possible to reduce a dark current.

Patent Document 1: Japanese Unexamined Patent Application Publication No. 2003-315149

However, in the above-described conventional photodetecting circuit, when light with a high modulation frequency is made incident on the photodiode, an output therefrom oscillates. Further, when intense light such as direct sunlight from the sun is made incident thereon, an excess current is generated in proportion to the light, which may causes troubles in the circuit operation. The present invention has been achieved in consideration of the above-described problems, and an object of the present invention is to provide a photodetecting circuit which is capable of suppressing oscillation of an output, and operating as a zero bias circuit in a case of a small photoelectric current to an extent that a dark current is concerned about, and operating as a current limiter circuit in a case of a large photoelectric current to an extent that troubles are caused in the circuit operation.

DISCLOSURE OF THE INVENTION

In order to solve the above-described problems, a photodetecting circuit according to the present invention includes integrating circuits connected to one end of a photodiode, a transistor provided between the photodiode and the integrating circuits, a resistive element provided between the transistor and the photodiode, and an operational amplifier having an output terminal connected to a control terminal of the transistor, a first input terminal connected to a nodal point between the resistive element and the transistor, and a second input terminal short-circuited to the other end of the photodiode.

A parasitic capacitance exists in the photodiode. However, an output voltage in an integrating circuit is originally affected by the parasitic capacitance. In the photodetecting circuit of the present invention, because the transistor is provided between the photodiode and the integrating circuit, an output voltage in the integrating circuit is hardly affected by the parasitic capacitance. The output terminal of the operational amplifier is connected to the control terminal (gate, or base) of the transistor, to feedback-control an electric potential at the resistive element side of the transistor. This electric potential is controlled such that a bias voltage of the photodiode is made to be a zero bias voltage.

An electric potential at the other end of the photodiode and the second input terminal of the operational amplifier are short-circuited to, for example, a ground potential, and because an electric potential at the first input terminal of the operational amplifier controls an electric potential at the control terminal of the transistor to be equal to this electric potential, the photodiode is zero-biased.

Here, when a modulation frequency of light made incident on the photodiode is made higher, an electric current to be inputted to the integrating circuit oscillates when there is no resistive element. In the present invention, because the resistive element is provided, even when a modulation frequency of light, in other words, a frequency of a photoelectric current flowing in the photodiode is made higher, oscillation is suppressed. Further, due to the resistive element being inserted, this functions as a limiter as well with respect to a photoelectric current, and when intense light is made incident thereon, a bias voltage to be applied to the photodiode is made to be a positive bias voltage, and an excess photoelectric current is not made to flow. To be exact, the photodiode is driven to be zero-biased only in a dark state. The reason for this, which will be described later, is that a bias of the photodiode itself is made to be a slightly positive bias by a voltage drop due to a photoelectric current and the inserted resistive element. However, this voltage drop is extremely small in a photoelectric current to an extent that a dark current is concerned about, and an electric current due to the positive bias is negligible. Further, the resistive element to be inserted selects such a value.

In this way, in accordance with the above-described photodetecting circuit, it is possible to suppress oscillation of an output while reducing the effect of the parasitic capacitance of the photodiode, and the photodetecting circuit functions as a limiter circuit with respect to an excess current.

Further, the photodetecting circuit of the present invention includes comparators to which outputs from the integrating circuits are inputted, and a reset signal generating means for resetting the integrating circuits in accordance with an output from the comparators, and the photodetecting circuit performs conversion of a photoelectric current generated in the photodiode into a frequency. That is, when a voltage generated in accordance with a quantity of electric charges stored in the integrating circuit is made higher than a threshold value of the comparator, an output from the comparator is switched. That is, the higher the intensity of the photoelectric current is, the shorter the period in which an output from the comparator is switched is, and when an output from the comparator is switched, the reset signal generating means resets the integrating circuit, and starts charge storage again. In this way, a photoelectric current generated in the photodiode is converted into a frequency.

Further, in the photodetecting circuit of the present invention, a limiter circuit to limit an electric current flowing in the photodiode is provided between the transistor and the integrating circuits. In this case, because an electric current to be inputted to the integrating circuit is limited, it is possible to set an upper limit of output frequency. The term "limiter circuit" here is different from that to suppress an excess electric current and abnormal operations of the circuit in conjunction therewith due to the resistive element being inserted in the photodetecting circuit of the present invention. Suppression of an electric current by the limiter circuit of a type of limiting an electric current functions in a photoelectric current less than an electric current in which an effect due to the resistive element being inserted functions. There is a limit to the ability to suppress an electric current by the limiter circuit, and the limiter effect due to the resistive element being inserted is exerted with respect to a quantity of electric current exceeding the limit.

According to the photodetecting circuit of the present invention, it is possible to suppress oscillation of an output current, and the photodetecting circuit is capable of functioning as a zero bias circuit in a case of a small photoelectric current, and as a limiter with respect to an excess photoelectric current. The limiter effect with respect to an excess current is furthermore capable of suppressing abnormal operations of the circuit in conjunction therewith.

REFERENCE NUMERALS

Figure 1:
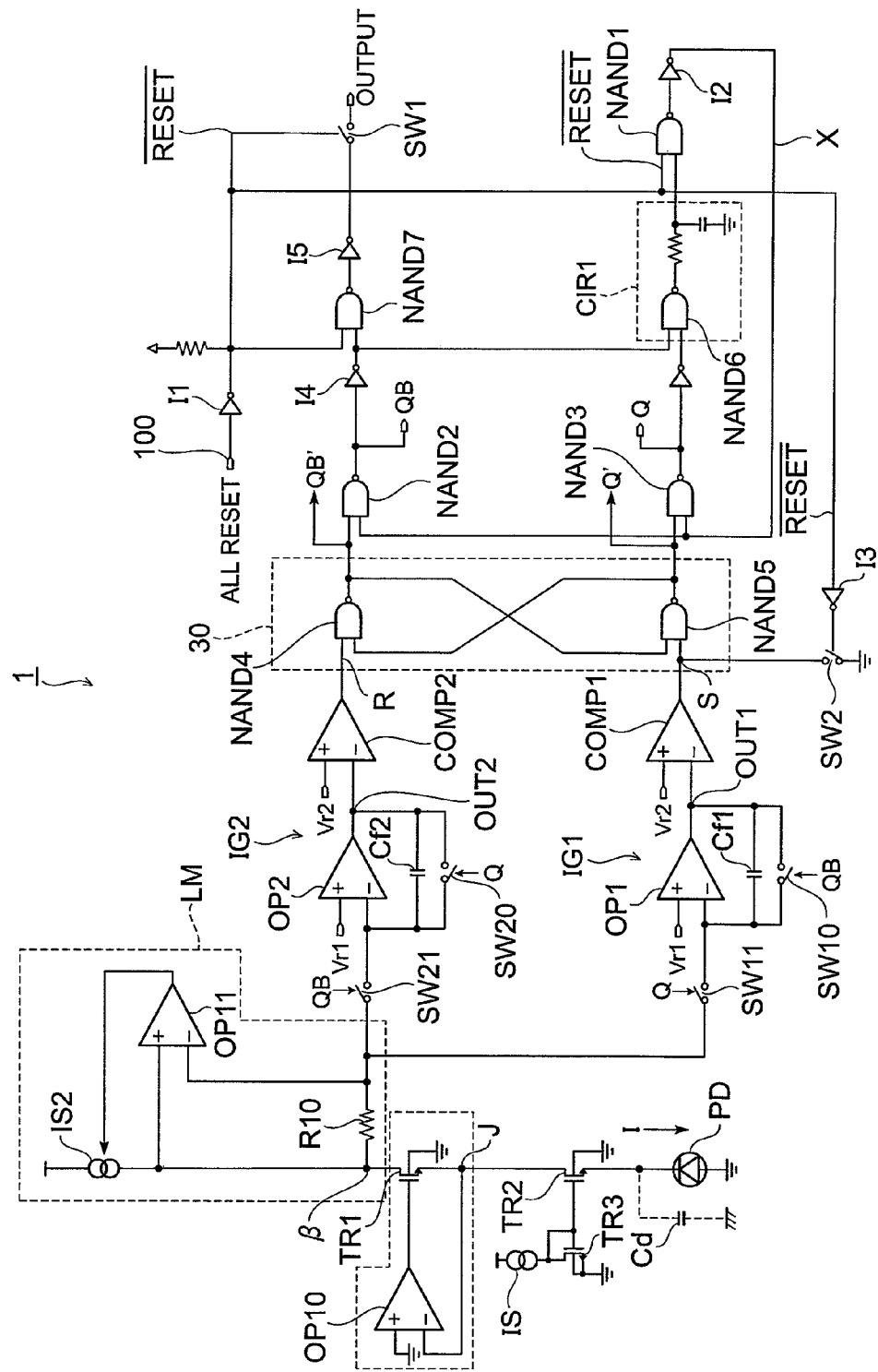
FIG. 1 is a circuit diagram of a photodetecting circuit.

IG1, IG2 Integrating circuit
PD Photodiode
TR1 Transistor
TR2 Resistive element

BEST MODES FOR CARRYING OUT THE INVENTION

Hereinafter, a photodetecting circuit according to an embodiment will be described. Note that the same elements are denoted by reference numerals, and overlapping descriptions thereof will be omitted.

FIG. 1 is a circuit diagram of the photodetecting circuit.

The photodetecting circuit 1 includes an integrating circuit IG1 connected to a cathode of a photodiode PD.

The integrating circuit IG1 has a capacitor Cf1 provided between an output terminal and an inverting input terminal of an operational amplifier OP1, a switch SW10 capable of short-circuiting between the both terminals of the capacitor Cf1, and a gate switch SW11 carrying out connection and disconnection of an input signal with respect to the operational amplifier OP1. A reference potential Vr1 is provided to a non-inverting input terminal of the operational amplifier OP1.

A signal Q is provided to the gate switch SW11 of the integrating circuit IG1, and when the Q is at an H level, the gate switch SW11 is turned on. A signal QB (Q bar) complementary to the signal Q is provided to the short-circuit switch SW10, and when the QB is at an H level, the switch SW10 is turned on.

When the integrating circuit IG1 is reset, the signal QB is set at an H level, and the short-circuit switch SW10 is turned on, and when storage of charge is started, the signal Q is set at an H level, the gate switch SW11 is turned on, and the short-circuit switch SW10 is opened (QB=L level).

This photodetecting circuit 1 further has an integrating circuit IG2 connected to a cathode of the photodiode PD. The integrating circuit IG2 operates in a complementary manner to the integrating circuit IG1. That is, while the integrating circuit IG1 is carrying out storage of charge, the integrating circuit IG2 is in a reset state, and when the integrating circuit IG1 is reset, the integrating circuit IG2 is carrying out storage of charge. That is, because it is possible for the other integrating circuit to store charges even while one integrating circuit is being reset, it is possible to perform conversion of a photoelectric current into a frequency with satisfactory linearity up to a high modulation frequency.

The integrating circuit IG2 has a capacitor Cf2 provided between an output terminal and an inverting input terminal of an operational amplifier OP2, a switch SW20 capable of short-circuiting between the both terminals of the capacitor Cf2, and a gate switch SW21 carrying out connection and disconnection of an input signal with respect to the operational amplifier OP2. A reference potential Vr1 is provided to a non-inverting input terminal of the operational amplifier OP2.

When a signal Q is provided to the gate switch SW11 of the one integrating circuit IG1, a signal QB is provided to the gate switch SW21 of the other integrating circuit IG2. When the QB is at an H level, the gate switch SW21 is turned on. A signal Q complementary to the signal QB is provided to the short-circuit switch SW20, and when the Q is at an H level, the switch SW20 is turned on.

When the integrating circuit IG2 is reset, the signal Q is set at an H level, and the short-circuit switch SW20 is turned on, and when storage of charge is started, the signal QB is set at an H level, and the gate switch SW21 is turned on, and the short-circuit switch SW20 is opened (Q=L level).

Further, the photodetecting circuit 1 includes a comparator COMP1 to which an output of the integrating circuit 101 is inputted, and an RS flip-flop 30 (reset signal generating means: an S terminal for input) to reset the integrating circuit IG1 in accordance with an output from the comparator COMP1, and performs conversion of a photoelectric current generated in the photodiode PD into a frequency.

A voltage OUT1 generated in accordance with a quantity of electric charges stored in the integrating circuit 101 is made higher than a threshold value Vr2 of the comparator COMP1, and output from the comparator COMP1 is switched from an H level to an L level.

Further, the photodetecting circuit 1 includes a comparator COMP2 to which an output of the other integrating circuit 102 is inputted, and an RS flip-flop 30 (reset signal generating means: an R terminal for input) to reset the integrating circuit 102 in accordance with an output from the comparator COMP2, and performs conversion of a photoelectric current generated in the photodiode PD into a frequency.

A voltage OUT2 generated in accordance with a quantity of electric charges stored in the integrating circuit 102 is made higher than a threshold value Vr2 of the comparator COMP2, and output from the comparator COMP2 is switched from an H level to an L level.

That is, because the higher the intensity of the photoelectric current is, the shorter the period required for storing electric charges over the threshold value is, and output from the comparator is switched in a short period, and when an output from the comparator is switched, the outputs (Q, QB) from the flip-flop 30 reset the integrating circuit IG1 or IG2 alternately, and storage of charge is started again. In this way, conversion of a photoelectric current generated in the photodiode PD into frequency is performed.

The RS flip-flop is formed such that two NAND circuits (NAND4, NAND5) are connected to one another, and when the input terminal S is 1 and the input terminal R is 0, an output Q' is 0 and an output QB' is 1. Further, when the input terminal S is 0 and the input terminal R is 1, an output Q' is 1 and an output QB' is 0. When the input terminal S is 1 and the input terminal R is 1, outputs Q' and QB' are invariable. An H level is defined as 1, and an L level is defined as 0.

NAND circuits (NAND2, NAND3) for all-reset of the integrating circuits and the measurement timings are connected to the latter parts of the RS flip-flop 30, and outputs from these circuits are inputted as signals Q and QB to the respective switches of the integrating circuits IG1 and IG2.

When an all-reset signal ALL RESET (hereinafter called a RESET signal) is inputted from a reset terminal 100, an inversion RESET signal (RESET bar) is generated via an inverter I1. The inversion RESET signal is inputted to an output control switch SW1. When the RESET signal is at an H level, the inversion reset signal is at an L level. At this time, the output control switch SW1 is turned off, and an output from the NAND circuit (NAND1) is made at an H level. Because an output from the NAND1 via an inverter I2, an electric potential of this line X is made at an L level. When the line X is at an L level, signals at an L level are inputted to the NAND circuits (NAND2, NAND3) for all-reset, and the signals Q and QB are made at an H level, and the both integrating circuits IG1 and IG2 are reset. Note that, in a normal control state, it is a matter of course that the values of the Q and QB are different from one another.

When a RESET signal at an H level is inputted, a RESET signal at an H level is inputted to a switch SW2 via inverters I1 and I3, and the S terminal of the RS flip-flop 30 is connected to the ground to be at an L level, and the RS flip-flop 30 as well is reset. When the RESET signal to be inputted is made at an L level, a photodetecting circuit output OUTPUT always starts from a same output value (an L level).

Note that a circuit CIR1 is provided in order to prevent destabilization of the circuit due to the Q and QB being made at an L level. That is, when the Q and QB are made at an L level, the circuit operates such that a NAND6 is made at an L level, and the X line is made at an L level, and the signals Q and QB are made at an H level.

Note that an output from the RS flip-flop 30 is outputted to the outside via an inverter I4, a NAND circuit (NAND7), an inverter I5, and the output control switch SW1. Because a signal at an H level is usually inputted to one side of the NAND7, the output control switch SW1 does not actually function until the RESET signal is made at an H level.

A transistor TR1 is provided between the photodiode PD and the integrating circuit IG1 (IG2). A resistive element (a transistor in this example: FET) TR2 is provided between the transistor TR1 and the photodiode PD. An operational amplifier OP10 is connected to the transistor TR1.

The operational amplifier OP10 has an output terminal connected to a control terminal (gate) of the N-channel transistor TR1, an inverting input terminal (a first input terminal) connected to a nodal point J between the resistive element TR2 and the transistor TR1, and a non-inverting input terminal (a second input terminal) short-circuited to an anode of the photodiode PD.

A parasitic capacitance Cd exists in the photodiode PD. However, an output voltage OUT1 (OUT2) in the integrating circuit IG1 (IG2) is originally affected by the parasitic capacitance Cd. In the photodetecting circuit 1 of the present embodiment, because the transistor TR1 is provided between the photodiode PD and the integrating circuit IG1 (IG2), an output voltage OUT1 (OUT2) in the integrating circuit IG1 (IG2) is hardly affected by the parasitic capacitance Cd.

An output terminal of the operational amplifier OP10 is connected to a control terminal (gate, or base) of the transistor TR1, to feedback-control an electric potential at the nodal point J at the resistive element side of the transistor TR1. This electric potential is controlled such that a bias voltage of the photodiode PD is made to be a zero bias voltage.

An electric potential at the anode of the photodiode PD and the non-inverting input terminal of the operational amplifier OP10 are short-circuited to a ground potential, and because an electric potential at the inverting input terminal of the operational amplifier OP10 controls an electric potential at the control terminal of the transistor TR1 to be equal to an electric potential at the non-inverting input terminal, the photodiode PD is zero-biased. To be exact, the photodiode is driven to be zero-biased only in dark state. The reason for this is that the J point in FIG. 1 is controlled to be zero-biased by the transistor and the operational amplifier, and a bias of the photodiode itself is made to be a slightly positive bias by a voltage drop due to a photoelectric current and the inserted resistive element (TR2). However, this voltage drop is extremely small in a photoelectric current to an extent that a dark current is concerned about, and an electric current by the positive bias is negligible. Further, the resistive element to be inserted selects such a value.

The resistive element TR2 is composed of an N-channel transistor. The transistor TR1 and the resistive element TR2 are connected in series. The control terminal of the transistor structuring the resistive element TR2 is fixed to a constant potential. This constant potential is composed of a transistor TR3 to which the control terminal is connected and a current source IS connected to the transistor TR3 at the control terminal of the resistive element TR2. This current source IS may be structured inside the operational amplifier OP10.

A limiter circuit LM to limit an electric current I flowing in the photodiode PD is provided between the transistor TR1 and the integrating circuit IG1 (IG2). In this case, because an electric current to be inputted to the integrating circuit IG1 (IG2) is limited, it is possible to set an upper limit of an output frequency. The limiter circuit LM has a resistance R10 provided between the transistor TR1 and the integrating circuit IG1, an operational amplifier OP11 having inverting/non-inverting input terminals connected to the both ends of the resistance R10, and a current source IS2 controlled by an output from the operational amplifier OP11, and the current source IS2 is connected to the transistor TR1.

When an electric current flowing in the resistance R10 is increased, and a difference in the electric potentials generated in the resistance R10 is made higher, an electric current is supplied from the current source IS2 such that an electric current flowing in the resistance R10 is decreased.

Figure 2:
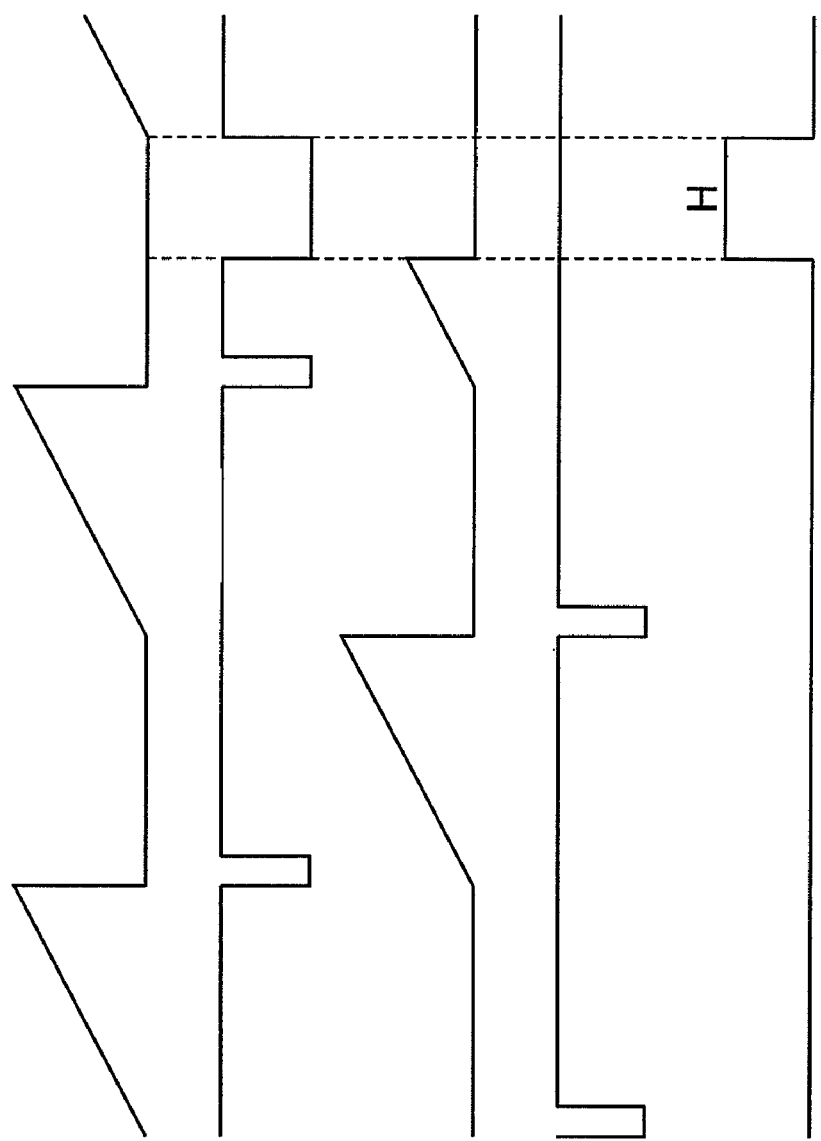
FIG. 2 is a timing chart for explanation of circuit operations.

FIG. 2 is a timing chart for explanation of operations of the above-described circuit.

In a case in which an all-reset signal (ALL RESET) is at an L level, when light is made incident on the photodiode PD, the photoelectric current I flows in the photodiode PD, and when a signal Q is at an H level, storage of charge is started into the capacitor Cf1 of the one integrating circuit IG1, and an output voltage OUT1 rises linearly (a).

When an output voltage OUT1 is made higher than a reference voltage Vr2 of the comparator COMP1, an output from the comparator COMP1 which has been at an H level up to that time is inversed to be switched to an L level. That is, an L level is inputted to the S terminal of the RS flip-flop 30 (b).

Then, outputs from the RS flip-flop 30 are switched, and the Q is made at an L level and the QB is at an H level. That is, the capacitor Cf1 of the integrating circuit IG1 is short-circuited, and a reset thereof is carried out, and the output voltage OUT1 is made at an L level. Accordingly, an voltage to be inputted to the S terminal returns to an H level from an L level.

At this time, because the Q is at an L level and the QB is at an H level in the other integrating circuit IG2, storage charge is started, and an output voltage OUT2 rises linearly (c). When the output voltage OUT2 is made higher than a reference voltage Vr2 of the comparator COMP2, an output from the comparator COMP2 is inversed from an H level to an L level, and a signal at an L level is inputted to the R terminal, and outputs from the RS flip-flop 30 are switched (d). Thereafter, operations are carried out in the same way as the operations of the route at the integrating circuit IG1 side.

When the all-reset signal is at an H level, the RS flip-flop 30 and the integrating circuits IG1 and IG2 are reset at the same time, and a photometric operation is newly started.

Here, the effect of the resistive element TR2 will be described.

Figure 3:
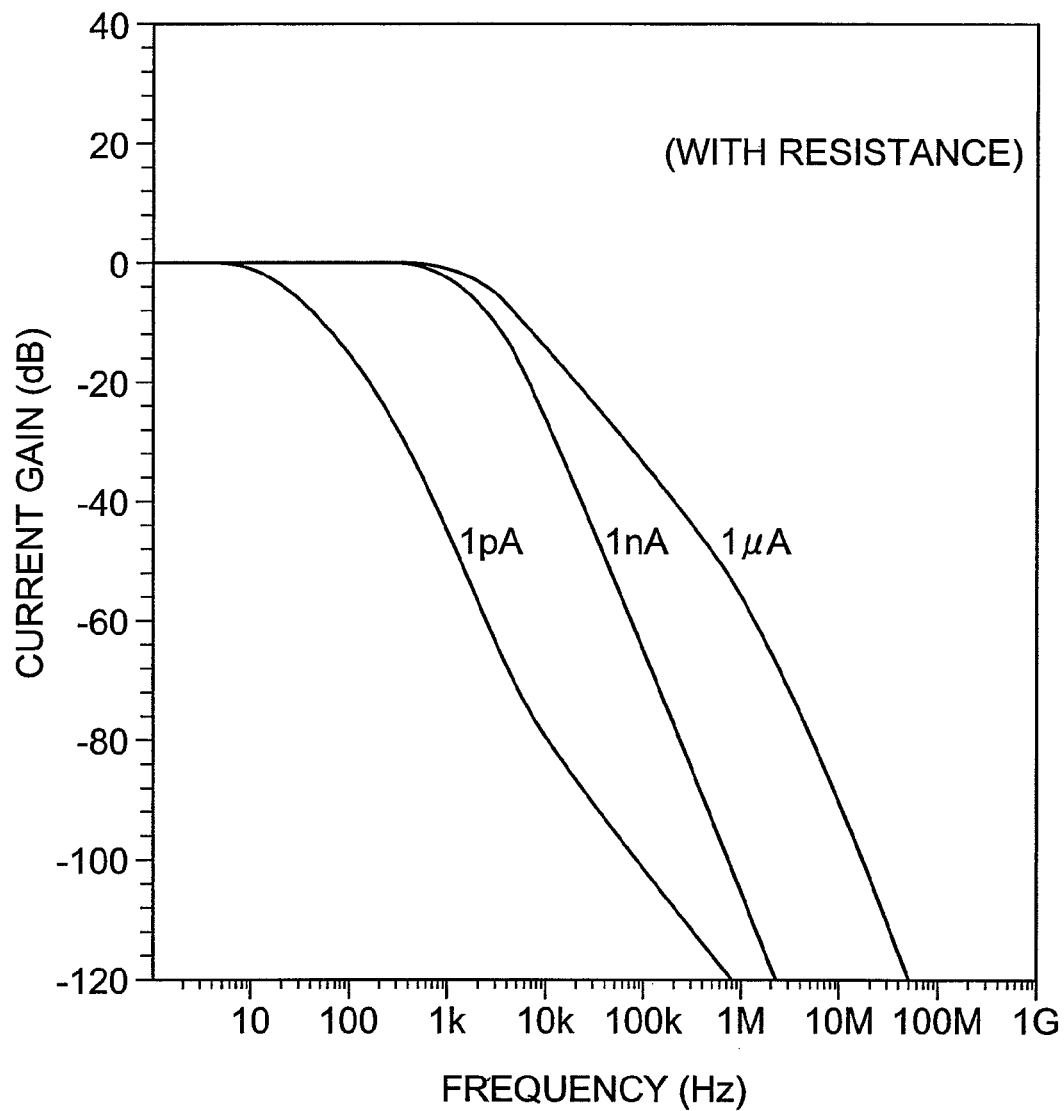
FIG. 3 is a graph showing relationships between frequencies and output current gains of a photoelectric current.
Figure 4:
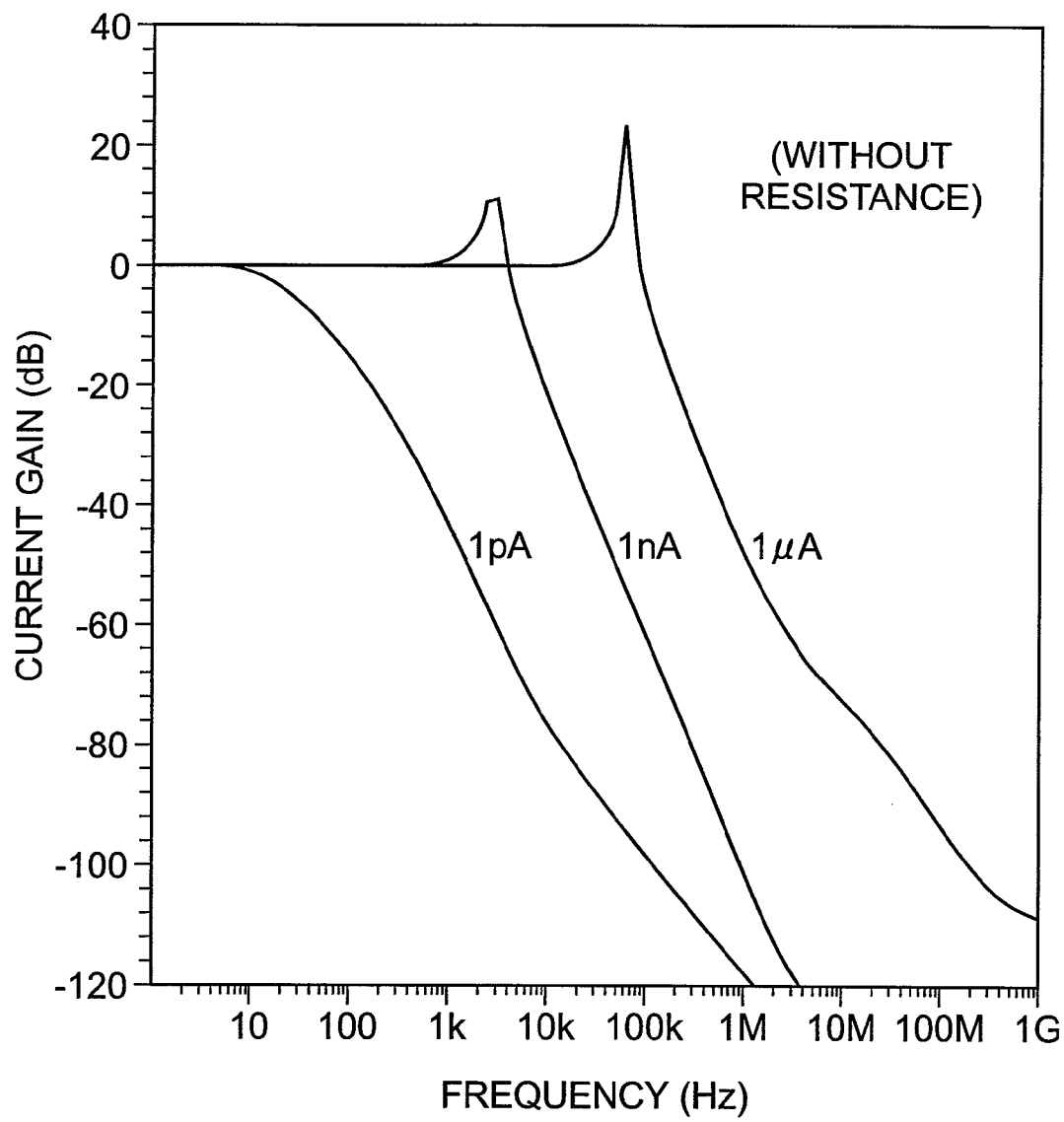
FIG. 4 is a graph showing relationships between frequencies and output current gains of a photoelectric current.

FIG. 3 is a graph showing relationships between frequencies and output current gains of a photoelectric current (when there is the resistive element TR2), and FIG. 4 is a graph showing relationships between frequencies and output current gains of a photoelectric current (when there is no resistive element TR2).

In these graphs, current gains (dB) of an electric current flowing on a nodal point β with respect to the photoelectric current I are shown with frequencies (Hz) of the photoelectric current I being as an abscissa. The photoelectric current I is made to vary as 1 (pA) and 1 (nA) to 1 (μA). When a modulation frequency of light made incident on the photodiode PD is made higher, i.e., when a frequency of the photoelectric current I is made higher, an electric current to be inputted to the integrating circuit IG1, i.e., an electric current at the nodal point β oscillates when there is no resistive element TR2. In FIG. 4, a peak of oscillation has been observed at a frequency of 1 k to 1M (Hz).

On the other hand, in the photodetecting circuit of the present embodiment, because the resistive element TR2 is provided, even when a modulation frequency of light, in other words, a frequency of the photoelectric current I flowing in the photodiode PD is made higher, oscillation is suppressed (refer to FIG. 3). Further, due to the resistive element TR2 being inserted, this functions as a limiter as well with respect to the photoelectric current, and when excess light is made incident on the photodiode PD, a bias voltage to be applied thereto is made to be a positive bias voltage, and an excess current is not generated.

In this way, in accordance with the above-described photodetecting circuit 1, it is possible to suppress oscillation of an output while reducing the effect of the parasitic capacitance of the photodiode, and the photodetecting circuit operates as a zero bias circuit in a case of a small photoelectric current to an extent that a dark current is concerned about, and functions as a limiter circuit in a case of a large photoelectric current to be able to suppress abnormal operations of the circuit.

INDUSTRIAL APPLICABILITY

The present invention can be utilized for a photodetecting circuit.

The invention claimed is:

1. A photodetecting circuit comprising:
   integrating circuits connected to one end of a photodiode;
   a transistor provided between the photodiode and the integrating circuits;
   a resistive element provided between the transistor and the photodiode; and
   an operational amplifier having an output terminal connected to a control terminal of the transistor, a first input terminal connected to a nodal point between the resistive element and the transistor, and a second input terminal short-circuited to the other end of the photodiode,
   wherein the transistor and the resistive element are connected in series, and
   wherein, when a signal is at a predetermined level, a storage of charge is started in at least one of the integrating circuits.

2. The photodetecting circuit according to claim 1 further comprising:
   comparators to which outputs of the integrating circuits are inputted; and
   reset signal generating means for resetting the integrating circuits in accordance with an output from the comparators,
   the photodetecting circuit performs conversion of a photoelectric current generated in the photodiode into a frequency.

3. The photodetecting circuit according to claim 1, wherein a limiter circuit to limit an electric current flowing in the photodiode is provided between the transistor and the integrating circuits.

4. The photodetecting circuit according to claim 1, wherein the output terminal of the operational amplifier is directly connected to the control terminal of the transistor.

* * * * *